(12) United States Patent
Nakamura et al.

(10) Patent No.: US 7,291,210 B2
(45) Date of Patent: Nov. 6, 2007

(54) SOLID DRAWING MATERIAL AND METHOD FOR PRODUCING THE SAME

(75) Inventors: Keiko Nakamura, Osaka (JP); Kotaro Sumitomo, Osaka (JP); Hidetoshi Fukuo, Osaka (JP)

(73) Assignee: Sakura Color Products Corporation, Osaka (JP)

( * ) Notice: Subject to any disclaimer, the term of this patent is extended or adjusted under 35 U.S.C. 154(b) by 53 days.

(21) Appl. No.: 11/044,165

(22) Filed: Jan. 28, 2005

(65) Prior Publication Data

US 2005/0252409 A1  Nov. 17, 2005

(30) Foreign Application Priority Data

Jan. 29, 2004 (JP) ............................. 2004-021311
Jan. 29, 2004 (JP) ............................. 2004-021565

(51) Int. Cl.
*C09D 13/00* (2006.01)
(52) U.S. Cl. ............................. 106/31.12; 106/31.08; 106/31.1
(58) Field of Classification Search ............. 106/31.12, 106/31.08, 31.1
See application file for complete search history.

(56) References Cited

U.S. PATENT DOCUMENTS 5,725,642 A * 3/1998 Kano et al. ............... 106/31.07
6,033,464 A * 3/2000 Craig ....................... 106/31.29
6,316,526 B1 * 11/2001 Lugert ........................ 523/164
2005/0053633 A1 * 3/2005 Von Godin et al. ......... 424/401
2005/0197423 A1 * 9/2005 Fukuo et al. ................ 523/160
2005/0211132 A1 * 9/2005 Sprogar et al. .......... 106/31.11

* cited by examiner

Primary Examiner—J. A. Lorengo
Assistant Examiner—Veronica Faison-Gee
(74) Attorney, Agent, or Firm—Wenderoth, Lind & Ponack, L.L.P.

(57) ABSTRACT

Disclosed herein is a first solid drawing material comprising water, a coloring agent, a solidifying agent that is a fatty acid alkali metal salt, and an O/W type emulsion of a separating agent that is an oily material which hardly volatilizes at room temperature. The first solid drawing material preferably contains silicone oil. A second solid drawing material is also disclosed, which comprises an organic solvent, a coloring agent, a solidifying agent that is at least one selected from the group consisting of dibenzylidene sorbitol, tribenylidene sorbitol, and derivatives thereof, a separating agent that is an oily material which hardly volatilizes at room temperature, and a resin soluble in the organic solvent. In these solid drawing materials, the separating agent is evenly dispersed, and therefore they have stable drawing properties and erasability.

10 Claims, No Drawings

SOLID DRAWING MATERIAL AND METHOD FOR PRODUCING THE SAME

FIELD OF THE INVENTION

The present invention relates to a solid drawing material and method of producing the same. More particularly, the invention relates to a solid drawing material, e.g., a crayon- or chalk-like solid drawing material which provides writing on an impervious writing surface such as a whiteboard, wherein the writing is readily erasable by being wiped lightly with paper, cloth, or an eraser (a whiteboard eraser), and a method of producing such a solid drawing material.

PRIOR ART

As writing instruments which provide writing on impervious writing surfaces such as whiteboards, colored boards, glass, enamel panels or plastic panels (hereinafter, simply referred to as "whiteboards") wherein the writing is erasable by being wiped with paper, cloth, or erasers, so-called "whiteboard markers" are heretofore known. Such a whiteboard marker is usually a solvent-type marker using oil-based ink containing a volatile organic solvent such as alcohols so that there is concern about environmental health. In addition, there is a problem that a conventional whiteboard marker provides writing that is not completely erased depending on the surface properties of a whiteboard used so that the writing leaves stains on the surface of the whiteboard. Further, when the writing is wiped with an eraser before dried, there is a case where the writing is spread and is not completely erased so that stains remain on the surface of the whiteboard. Another problem is that the organic solvent evaporates from the ink so that clogging occurs in the interior of the writing instrument, especially in an ink reservoir or a pen point, which makes it difficult to provide writing.

There is also known a whiteboard marker using water as a solvent instead of an organic solvent. However, writing provided on a whiteboard by such a whiteboard marker is dried slower than that provided by a whiteboard marker using a volatile organic solvent. That is, such a whiteboard marker using water as a solvent is particularly inferior in erasability just after drawing.

Some solid drawing materials different from conventional solvent-type whiteboard markers have been already proposed, which are crayon- or chalk-like solid drawing materials substantially containing no solvent. As disclosed in, for example, Japanese Patent Laid-open No. 52-21925, such a solid drawing material generally contains a solidifying agent for solidifying various components such as a coloring agent together and a separating agent that makes it possible to erase writing provided on a whiteboard.

In Japanese Patent Laid-open Nos. 1996-12917 and 1976-9930, higher fatty acid alkali metal salts and metallic soap are used as a solidifying agent. In Japanese Patent Laid-open No. 2000-240789, waxes are used as a solidifying agent. Further, in Japanese Patent Laid-open No. 1996-113753, fatty acid amide is used as one component of a solidifying agent. As for a separating agent, higher fatty acid esters, higher alcohols, and mineral oils are known, as disclosed in Japanese Patent Laid-open Nos. 1987-288673 and 1989-092282.

However, in such a conventional solid drawing material, a separating agent tends to be unevenly distributed. Particularly, such a tendency becomes more significant as time passes after producing the solid drawing material, thereby causing a problem that the solid drawing material cannot maintain stable drawing properties and erasability. Further, there is a case where writing firmly adheres to the surface of a whiteboard so that the writing is not readily erased. Furthermore, there is a case where bleeding of a separating agent occurs when the solid drawing material is left standing for a long time after production so that the solid drawing material provides blurred or faint writing, or the solid drawing material has difficulty in providing writing.

SUMMARY OF THE INVENTION

The present invention has been completed to overcome such problems that are involved in the prior art solid drawing materials. It is therefore an object of the invention to provide a solid drawing material in which a separating agent is evenly dispersed therein and which provides writing not firmly adhering to a whiteboard, maintains stable drawing properties and good erasability even after solid matter is decreased with use, and causes no bleeding of the separating agent even when being left standing for a long time, especially a solid drawing material which maintains good erasability of writing even when being left standing for a long time after production. It is also an object of the invention to provide a method of producing such a solid drawing material.

The invention provides a first solid drawing material which comprises water, a coloring agent, a solidifying agent that is a fatty acid alkali metal salt, and an O/W type emulsion of a separating agent that is an oily material which hardly volatilizes at room temperature. It is preferred that the first solid drawing material further comprises silicone oil.

It is also preferred that the first solid drawing material contains the coloring agent in the form of a water dispersion of a pigment obtained by dispersing the pigment in water by the use of a dispersant that is a water-soluble resin. In this case, the first solid drawing material preferably contains the dispersant that is a water-soluble resin in such a manner that the weight ratio of the resin to the pigment is in the range of 0.2 to 3.

The invention also provides a method of producing the first solid drawing material. The method comprises the steps of mixing a water dispersion of a pigment obtained by dispersing the pigment in water by the use of a dispersant that is a water-soluble resin, a solidifying agent that is a fatty acid alkali metal salt, and an O/W type emulsion of a separating agent that is an oily material which hardly volatilizes at room temperature, in water by the application of heat, or mixing a water dispersion of a pigment obtained by dispersing the pigment in water by the use of a dispersant that is a water-soluble resin, a solidifying agent that is a fatty acid alkali metal salt, an O/W type emulsion of a separating agent that is an oily material which hardly volatilizes at room temperature, and silicone oil, in water by the application of heat, to dissolve the fatty acid alkali metal salt in water to obtain a mixture, pouring the mixture into a mold, and cooling the mixture to solidify it.

According to the invention, the method of producing the first solid drawing material may further comprises the step of drying the molded product obtained by cooling and solidifying the mixture as described above, by the application of heat to remove water from the molded product.

The invention further provides a second solid drawing material which comprises an organic solvent, a coloring agent, a solidifying agent that is at least one selected from the group consisting of dibenzylidene sorbitol, tribenzylidene sorbitol and derivatives thereof, a separating agent that is an oily material which hardly volatilizes at room temperature, and a resin soluble in the organic solvent. According to the invention, the second solid drawing material preferably contains the resin in such a manner that the weight ratio of the coloring agent to the resin is in the range of 0.2 to 3.

DETAILED DESCRIPTION OF THE INVENTION

Hereinbelow, the first solid drawing material according to the invention will be described. The amounts of components constituting the first solid drawing material are expressed in terms of percent by weight based on the composition including water, and the balance is water.

The first solid drawing material comprises water, a coloring agent, a solidifying agent that is a fatty acid alkali metal salt, and an O/W type emulsion of a separating agent that is an oily material which hardly volatilizes at room temperature. The first solid drawing material usually contains a pigment as a coloring agent. Such a pigment may be either an organic pigment or an inorganic pigment. Examples of the pigment used include phthalocyanine pigments such as copper phthalocyanine blue, threne pigments, azo pigments, quinacridon pigments, anthraquinone pigments, dioxazine pigments, indigo pigments, thioindigo pigments, perinone pigments, perylene pigments, indolenone pigments, azo-azomethine pigments, and carbon black. When necessary, inorganic pigments such as titanium oxide, iron oxide, iron red, chromium oxide, calcium carbonate, clay, and talc, fluorescent pigments, colored resin particles, aluminum powder pigments, and various extenders may also be used. It is to be noted that a coloring agent used in the invention is not limited to those exemplified above.

The solid drawing material according to the invention usually contains a coloring agent in an amount of 0.1 to 30% by weight. If the amount of a coloring agent contained in the solid drawing material is less than 0.1% by weight, the resultant solid drawing material fails to provide writing of a sufficient darkness. That is, such a solid drawing material is not suitable for practical use. On the other hand, if the amount of a coloring agent contained in the solid drawing material exceeds 30% by weight, the resultant solid drawing material is poor in erasability of writing so that writing is likely to leave stains on a whiteboard. Particularly, the solid drawing material of the invention preferably contains a coloring agent in an amount of 0.1 to 10% by weight, most preferably in an amount of 0.5 to 8% by weight.

According to the invention, the solid drawing material preferably contains a pigment in the form of a water dispersion obtained by dispersing the pigment in water by the use of a water-soluble resin as a dispersant. Hereinafter, such a water-soluble resin used as a dispersant for preparing a water dispersion of a coloring agent, especially a pigment, will be referred to as a "dispersant resin". Examples of such a dispersant resin include partially-saponified polyvinyl alcohol resins and water-soluble resins obtained by salt formation using styrene-acrylic resins or styrene-maleic acid resins and bases such as alkali metal hydroxides, ammonia, and amine compounds. The degree of saponification of the partially-saponified polyvinyl alcohol resin is preferably in the range of 70 to 85 mol %.

The dispersant resin is usually used in an amount of 0.2 to 3 parts by weight, preferably of 0.5 to 2 parts by weight, with respect to 1 part by weight of a pigment used. The first solid drawing material contains the dispersant resin in an amount of 1 to 30% by weight, preferably in an amount of 0.5 to 20% by weight. If the water dispersion of a pigment contains a dispersant resin in excess with respect to the pigment, the resultant solid drawing material provides writing that firmly adheres to the surface of a whiteboard and is not readily erased. On the other hand, if the amount of dispersant resin contained in the water dispersion of pigment is too small, the resultant solid drawing material provides writing that is not completely erased by wiping with an eraser so that a so-called ghost is formed on a whiteboard. In this case, it is necessary to further wipe the whiteboard with the eraser to remove such a ghost. That is, such a solid drawing material is poor in erasability.

The incorporation of coloring agent in the form of a water dispersion of a pigment in the solid drawing material according to the invention makes it possible for the resulting solid drawing material to provide writing that is suppressed in spreading on a whiteboard when being wiped, thereby to improve erasability of writing and to prevent the whiteboard from being stained.

In a case where a pigment is not used in the form of a water dispersion, that is, in a case where a pigment is used as it is in producing the solid drawing material, it is preferred that the pigment be dispersed in water by the use of a binder resin (which will be described later) as a dispersant.

As described above, the solid drawing material of the present invention includes a separating agent for separating writing from a whiteboard, in the form of an O/W type emulsion of an oily material which hardly volatilizes at room temperature (25° C.). Such an O/W type emulsion is prepared using a surfactant as an emulsifier. An oily material which hardly volatilizes at room temperature (25° C.) used in the invention is not particularly limited as long as it can be used as a separating agent for use in producing so-called solvent-type erasable ink.

Preferred examples of such an oily material include aliphatic carboxylic acid esters, higher hydrocarbons, and higher alcohols. The aliphatic carboxylic acid esters include monobasic acid esters such as higher fatty acid esters, dibasic acid diesters, mono- or diesters of dihydric alcohols, mono-, di-, or triesters of trihydric alcohols, and polyglycerol esters. In the invention, the term "higher fatty acids" means fatty acids having 6 to 30 carbon atoms. Further, the terms "higher hydrocarbon" and "higher alcohol" mean hydrocarbons having 6 to 30 carbon atoms and alcohols having 6 to 30 carbon atoms, respectively.

Among such aliphatic carboxylic acid esters, examples of higher fatty acid alkyl esters and higher fatty acid glycerides include cetyl isooctanoate, isopropyl myristate, isopropyl palmitate, isooctyl stearate, 2-hexyldecyl isostearate, diethyl sebacate, and caprylic/capric triglyceride. Examples of higher hydrocarbons which hardly volatilize at room temperature (25° C.) include liquid paraffin and squalane. Examples of higher alcohols which hardly volatilize at room temperature (25° C.) include hexyl alcohol, octyl alcohol, and dodecyl alcohol. These oily materials may be used singly or in combination of two or more of them.

The O/W type emulsion of oily material is preferably prepared by using a nonionic surfactant as an emulsifier. The emulsion usually contains a nonionic surfactant in an amount of 1 to 20% by weight, preferably in an amount of 2 to 15% by weight. If the amount of a nonionic surfactant contained in the emulsion exceeds 20% by weight, the resultant solid drawing material provides writing that is likely to be spread when being wiped, that is, the solid drawing material is poor in erasability. On the other hand, if the amount of a nonionic surfactant contained in the emulsion is less than 1% by weight, the resultant emulsion has relatively large particles so that the emulsion is unstable.

This makes the dispersion of the emulsion in the solid drawing material unstable.

Examples of such a nonionic surfactant include polyoxyethylene alkyl ethers, polyoxyethylene polyoxypropylene alkyl ethers, polyoxyethylene sorbitan fatty acid esters, sorbitan fatty acid esters, polyoxyethylene glycerol fatty acid esters, polyglycerol fatty acid esters, polyoxyethylene sorbit fatty acid esters, polyoxyethylene castor oil, polyoxyethylene hydrogenated castor oil, polyethylene glycol fatty acid esters, polyoxyethylene alkylphenyl ethers, polyoxyethylene lanolin, and polyoxyethylene lanolin alcohol. Among these nonionic surfactants, polyoxyethylene alkyl ethers, polyoxyethylene polyoxypropylene alkyl ethers, polyoxyethylene sorbitan fatty acid esters and sorbitan fatty acid esters are preferably used.

The O/W type emulsion of oily material can be prepared by a conventional emulsifying method or is commercially available. When necessary, the solid drawing material may contain two or more emulsions of aliphatic carboxylic acid esters, higher hydrocarbons, and higher alcohols.

The solid drawing material of the invention usually contains, as a separating agent, an oily material which hardly volatilizes at room temperature (25° C.) in an amount of 1 to 30% by weight, preferably in an amount of 5 to 20% by weight. If the amount of a separating agent contained in the solid drawing material exceeds 30% by weight, it is difficult to solidify various components such as a separating agent together even when a solidifying agent (which will be described later) is used. On the other hand, if the amount of a separating agent contained in the solid drawing material is less than 1% by weight, the resultant solid drawing material becomes so hard that it is difficult to provide writing. This is because the separating agent, which hardly volatilizes at room temperature (25° C.), also functions as a plasticizer.

The incorporation of separating agent that is an oily material which hardly volatilizes at room temperature (25° C.) in the form of an O/W type emulsion into the solid drawing material according to the invention makes it possible that the separating agent is evenly dispersed in the solid drawing material, and therefore, the solid drawing material can maintain stable drawing properties and erasability even when solid matter is decreased with use. In addition, it is also possible to prevent the occurrence of bleeding of the oily material with the lapse of time, thereby enabling the solid drawing material to maintain excellent drawing properties and erasability even when the solid drawing material is left standing for a long time after production.

On the other hand, if the separating agent that is an oily material which hardly volatilizes at room temperature (25° C.) is used as it is, that is, if the separating agent is not used in the form of an O/W type emulsion in producing the solid drawing material, the oily material is unevenly distributed in the resultant solid drawing material. Therefore, the solid drawing material is poor in erasability of writing even just after production. Particularly, drawing properties and erasability of writing of such a solid drawing material are significantly lowered when the solid drawing material is stored for a long time because the bleeding of separating agent occurs with the lapse of time after production.

The solid drawing material of the invention contains a solidifying agent that is a fatty acid alkali metal salt for solidifying various components such as the above-described coloring agent and separating agent together. The solidifying agent is preferably an alkali metal salt such as a sodium salt or a potassium salt of higher fatty acid having 10 to 24 carbon atoms. Preferred examples of such a solidifying agent include sodium stearate, sodium palmitate, sodium myristate, sodium laurate, sodium oleate, sodium linoleate, potassium stearate, potassium palmitate, potassium myristate, potassium laurate, potassium oleate, and potassium linoleate. These fatty acid alkali metal salts may be used singly or in combination of two or more of them.

The solid drawing material contains such a solidifying agent in an amount of 1 to 50% by weight, preferably in an amount of 5 to 40% by weight. If the amount of a solidifying agent is too small, it is impossible to solidify various components together. On the other hand, if the amount of a solidifying agent is too large, it becomes difficult to produce the solid drawing material. The reason for this is as follows. As described hereinafter, the solid drawing material of the invention is obtained by heating various components such as a fatty acid alkali metal salt (a solidifying agent) to homogeneously dissolve them in water, and cooling the solution to solidify it. Therefore, if the amount of a fatty acid alkali metal salt is too much, it is difficult to dissolve it in water by the application of heat so that there is a possibility that a target solid drawing material cannot be obtained. Even if an excess amount of a fatty acid alkali metal salt is dissolved in water by the application of heat and various components are solidified together, there is a possibility that the obtained solid drawing material is too hard to provide writing.

The solid drawing material may be produced using, as a solidifying agent, a fatty acid alkali metal salt previously prepared. However, when necessary, a fatty acid alkali metal salt may be generated by reacting fatty acid with alkali metal hydroxide such as sodium hydroxide or potassium hydroxide in water in the course of the production of the solid drawing material.

The solid drawing material preferably contains, as a separating aid for improving erasability of writing, silicone oil together with a separating agent, i.e., an O/W type emulsion of an oily material which hardly volatilizes at room temperature (25° C.). The solid drawing material may contain silicone oil as it is or in the form of an O/W type emulsion prepared by using an appropriate surfactant.

In a case where the solid drawing material includes only water, a coloring agent, a solidifying agent containing a fatty acid alkali metal salt, and an O/W type emulsion of a separating agent that is an oily material, the fatty acid alkali metal salt used as a solidifying agent is likely to firmly adhere to the surface of a whiteboard when the solid drawing material provides writing on the whiteboard. Thus, there is a possibility that stains, that is, a ghost remains on the surface of the whiteboard even after the writing is wiped with an eraser.

On the other hand, when the solid drawing material contains silicone oil together with a separating agent, it can provide writing not firmly adhering to the surface of the whiteboard as well as it can provide writing more smoothly on a whiteboard. Therefore, the writing on the whiteboard is erased by lightly wiping with an eraser without leaving a ghost on the surface of the whiteboard.

Examples of such silicone oil to be used in the present invention include dimethyl silicone oil, methylphenyl silicone oil, methyl hydrogen silicone oil, cyclic dimethyl silicone oil, and silicone oil compounds containing finely powdered silica. Among these silicone oils, dimethyl silicone oil is preferably used. The solid drawing material according to the present invention contains such silicone oil in an amount of 0.5 to 15% by weight, preferably in an amount of 2 to 10% by weight. If the amount of silicone oil contained in the solid drawing material is less than 0.5% by weight, it is not possible to properly prevent writing from firmly adhering to the surface of a whiteboard. On the other hand, if the amount of silicone oil contained in the solid drawing material exceeds 15% by weight, it is impossible to provide writing on a whiteboard because the solid drawing material slips on the whiteboard.

When necessary, the solid drawing material of the invention may further contain a water-soluble resin as a binder for providing on a whiteboard, writing in the form of a film. The water-soluble resin functions as a matrix to combine various components of the solid drawing material together on a whiteboard. Such a water-soluble resin used as a binder will be referred to as a "binder resin". Examples of a binder resin include the above-mentioned dispersant resins, water-soluble polysaccharides such as pullulan, chitosan, sodium alginate, locust bean gum, guar gum, methylcellulose, and carboxymethylcellulose, water-soluble synthetic resins such as water-soluble acrylic resin and polyvinylpyrrolidone, and emulsions of water-insoluble resins such as acrylate resin, methacrylate resin, acrylic copolymers, vinyl acetate resin, vinyl acetate-based copolymers, natural rubber, and polyurethane-based resins. These water-soluble resins and emulsions may be used in combination of two or more of them when necessary.

In a case where the first solid drawing material contains such a binder resin, the total amount of the dispersant resin and the binder resin contained in the first solid drawing material is in the range of 1 to 30% by weight, preferably in the range of 0.5 to 20% by weight.

The solid drawing material of the invention is preferably obtained by mixing a water dispersion of a pigment obtained by dispersing the pigment in water by the use of a dispersant resin that is a water-soluble resin, a solidifying agent that is a fatty acid alkali metal salt, an O/W type emulsion of an oily material which hardly volatilizes at room temperature, and, when necessary, a binder resin that is a water-soluble resin, in water by the application of heat to dissolve the fatty acid alkali metal salt in water to obtain a homogeneous mixture, pouring the mixture into an appropriate mold, and cooling the mixture to solidify it.

The solid drawing material containing silicone is obtained by mixing a water dispersion of a pigment obtained by dispersing the pigment in water by the use of a dispersant resin that is a water-soluble resin, a solidifying agent that is a fatty acid alkali metal salt, an O/W type emulsion of an oily material which hardly volatilizes at room temperature, silicone oil, and, when necessary, a binder resin that is a water-soluble resin, in water by the application of heat to dissolve the fatty acid alkali metal salt in water to obtain a mixture, pouring the mixture into a mold, and cooling the mixture to solidify it. Therefore, a solid drawing material having any shape can be obtained according to the shape of a mold used. Thus, for example, a crayon-like solid drawing material can be obtained by the use of a cylindrical mold.

It is to be noted that in a case where a solid drawing material containing silicone oil is produced in such a manner described above, the silicone oil may be used as it is or in the form of an O/W type emulsion as described above.

In this way, the solid drawing material of the invention is obtained by mixing an O/W type emulsion of a separating agent that is an oily material which hardly volatilizes at room temperature, a coloring agent, and a solidifying agent that is a fatty acid alkali metal salt in water by the application of heat to dissolve the fatty acid alkali metal salt, in water to obtain a homogeneous mixture, and cooling the mixture, so that the separating agent is evenly and stably dispersed in the obtained solid drawing material. Therefore, bleeding of the separating agent does not occur in the solid drawing material of the invention even when it is stored for a long time after production so that the solid drawing material maintains good drawing properties and erasability of writing.

A preferred embodiment of the invention contains, as a coloring agent, a pigment in the form of a water dispersion in which the pigment is coated with the dispersant resin described above and is dispersed in water, and a separating agent in the form of an O/W type emulsion. That is, adsorption of an oily material (a separating agent) to the surface of particles of the pigment is prevented, and hence, the obtained solid drawing material provides on a whiteboard, writing that is not spread on the whiteboard when being wiped so that it is possible to prevent the whiteboard from being stained.

Particularly, by using silicone oil together with such a separating agent, it is possible to prevent the solid drawing material from being firmly adhered to the surface of a whiteboard, that is, it is possible to provide writing more readily erasable.

The solid drawing material of the invention produced in such a manner described above contains water in an amount of about 10 to 80% by weight, preferably in an amount of about 10 to 70% by weight, and therefore it has feeling similar to that of a crayon when being used in drawing. In a case where such a solid drawing material is stored for a long time, water contained in the solid drawing material is vaporized little by little, and as a result the volume of the solid drawing material is decreased. That is, the solid drawing material is shrunk with the lapse of time.

Therefore, as one of the aspects of the invention, the solid drawing material produced in such a manner described above may be dried by the application of heat to remove water from the solid drawing material. In this way, a solid drawing material having substantially no water can be obtained. Such a solid drawing material is not shrunk with the lapse of time because it has substantially no water. Accordingly, such a solid drawing material having substantially no water has feeling similar to that of chalk when used in drawing. When such a solid drawing material is used to provide writing on a whiteboard, the tip of the solid drawing material is crumbled like a chalk and is then adhered to the surface of the whiteboard to provide writing.

Next, the second solid drawing material according to the invention will be described. The second solid drawing material comprises an organic solvent, a coloring agent, a solidifying agent that is at least one selected from the group consisting of dibenzylidene sorbitol, tribenzylidene sorbitol, and derivatives thereof, a separating agent that is an oily material which hardly volatilizes at room temperature, and a resin soluble in the organic solvent.

As an organic solvent used in the second solid drawing material, at least one selected from the group consisting of alcohols, glycols, glycol monoethers, glycol monoether esters, and glycol diesters is preferred. Examples of alcohols include methanol, ethanol, isopropyl alcohol, 3-methyl-3-methoxybutanol, and 3-methoxy-1-butanol. Examples of glycols include (poly)alkylene glycols such as ethylene glycol, propylene glycol, diethylene glycol, and dipropylene glycol. Examples of glycol monoethers include monomethyl ethers, monoethyl ethers, monopropyl ethers, monobutyl ethers, and monophenyl ethers of the above-mentioned (poly)alkylene glycols. An example of glycol monoether esters includes propylene glycol monomethyl ether acetate. An example of glycol diesters includes propylene glycol diacetate. However, it is to be noted that glycol monoethers and glycol diesters are not limited to acetates. When necessary, propionates or esters of aliphatic carboxylic acid having more carbon atoms may be used.

Among these organic solvents, (poly)alkylene glycol monoalkyl ethers whose alkyl group has 1 to 4 carbon atoms, such as ethylene glycol monoalkyl ethers (e.g., ethylene glycol monobutyl ether), propylene glycol monoalkyl ethers (e.g., propylene glycol monomethyl ether, propylene glycol monopropyl ether, propylene glycol monobutyl ether), dipropylene glycol monoalkyl ethers (e.g., dipropylene glycol monomethyl ether), and esters, especially acetates thereof are preferably used. Among these alcohols, 3-methoxy-butanol is preferably used. These organic solvents may be used singly or in combination of two or more of them.

However, an organic solvent used is not limited to the organic solvents mentioned above. For example, aromatic hydrocarbons such as xylene and tetraline, alkylcyclohexanes whose alkyl group has 1 to 4 carbon atoms, such as n-propylcyclohexane and n-butylcyclohexane, ketones such as methyl isobutyl ketone, and lower aliphatic carboxylic acid esters such as butyl acetate and ethyl propionate may be used as an organic solvent.

In the present invention, the amount of an organic solvent contained in the second solid drawing material is appropriately determined in relation to components such as a coloring agent used. The second solid drawing material usually contains an organic solvent in an amount of 10 to 80% by weight, preferably in an amount of 20 to 80% by weight, most preferably in an amount of 30 to 60% by weight. If the amount of an organic solvent contained in the second solid drawing material exceeds 80% by weight, it is difficult to solidify the components of the solid drawing material together. That is, the obtained solid drawing material is too soft to provide writing. On the other hand, if the amount of an organic solvent contained in the solid drawing material is less than 10% by weight, it is difficult to dissolve a resin (which will be described later) in the organic solvent in producing the solid drawing material so that it becomes difficult to evenly disperse a pigment.

Examples of a solidifying agent used in the second solid drawing material include dibenzylidene sorbitol, tribenzylidene sorbitol, and derivatives thereof. As derivatives of dibenzylidene sorbitol, for example, compounds obtained by substituting an alkyl group having 1 to 3 carbon atoms for hhydrogen atoms at any positions on the benzene nucleus of each benzylidene group of dibenzylidene sorbitol can be mentioned. Specific examples of derivatives of dibenzylidene sorbitol include [di(p-methyl-benzylidene)]sorbitol, [di(m-ethylbenzylidene)]sorbitol, and [di(p-chlorobenzylidene)]sorbitol.

As derivatives of tribenzylidene sorbitol, for example, compounds obtained by substituting an alkyl group having 1 to 3 carbon atoms for hydrogen atoms at any positions on the benzene nucleus of each benzylidene group of tribenzylidene sorbitol can be mentioned. Specific examples of a derivative of tribenzylidene sorbitol include [tri(p-methyl-benzylidene)]sorbitol, [tri(m-ethyl-benzylidene)]sorbitol, and [tri(p-chlorobenzylidene)]sorbitol.

The amount of solidifying agent contained in the second solid drawing material is appropriately determined depending on the kind of solidifying agent used, but is usually in the range of 1 to 50% by weight, preferably in the range of 5 to 25% by weight, particularly preferably in the range of 6 to 20% by weight. If the amount of the solidifying agent contained in the solid drawing material exceeds 50% by weight, the obtained solid drawing material is too hard to provide writing. On the other hand, if the amount of a solidifying agent contained in the solid drawing material is less than 1% by weight, it is difficult to solidify the components of the solid drawing material together. Even if a solid drawing material can be produced, such a solid drawing material is so soft that it is difficult to provide writing.

As described above, the second solid drawing material includes a resin soluble in the organic solvent described above. The resin has the function of evenly and stably dispersing a coloring agent in the solvent in producing the second solid drawing material. When solid drawing material is used in writing on a whiteboard, the resin functions as a binder to combine the components of the solid drawing material together to provide the writing in the form of a film in which the resin functions as matrix.

Preferred examples of such a resin include cellulose-based resins such as cellulose acetate butylate, ethylcellulose, and acetylcellulose, and vinyl resins such as polyvinylbutyral, polyvinyl acetate, vinyl acetate-vinyl chloride copolymer resins, and vinyl acetate-ethylene copolymer resins. Among these resins, cellulose-based resins such as cellulose acetate butylate, ethylcellulose, and acetylcellulose are particularly preferred.

The second solid drawing material of the invention usually contains such a resin in an amount of 1 to 30% by weight, preferably in an amount of 2.5 to 20% by weight. If the amount of resin contained in the solid drawing material exceeds 30% by weight, the obtained solid drawing material is too hard to provide writing. Even if such a solid drawing material can provide writing, the writing is likely to firmly adhere to the surface of a whiteboard and is not readily erased. On the other hand, if the amount of a resin contained in the solid drawing material is less than 1% by weight, it is difficult to evenly disperse a pigment in producing the solid drawing material. Therefore, the resultant solid drawing material is poor in erasability of writing so that writing leaves stains on a whiteboard.

As described above, the second solid drawing material may contain a coloring agent so as to provide writing with any color. As a coloring agent, oil-soluble dyes well soluble in the above-described organic solvent as well as inorganic and organic pigments can be used, but inorganic and organic pigments are preferably used. Examples of inorganic and organic pigments include titanium oxide, iron red, carbon black, carmine 6B, threne blue, phthalocyanine blue, phthalocyanine green, DPP red, dioxazine, and azo pigments.

The second solid drawing material contains a coloring agent in an amount of 0.1 to 30% by weight, preferably in an amount of 2 to 30% by weight, particularly preferably in an amount of 5 to 20% by weight. If the amount of a coloring agent contained in the solid drawing material is less than 0.1% by weight, the obtained solid drawing material cannot sufficiently develop color. On the other hand, if the amount of a coloring agent contained in the solid drawing material exceeds 30% by weight, the obtained solid drawing material cannot have sufficient dispersion stability.

In a case where a pigment is used as a coloring agent in the second solid drawing material, the weight ratio of the pigment to the resin is preferably in the range of 0.2 to 3, more preferably in the range of 0.5 to 2. If the weight ratio of the pigment to the resin exceeds 3, there is a problem that writing provided on a whiteboard is spread when being wiped with an eraser. On the other hand, if the weight ratio of the pigment to the resin is less than 0.2, the provided writing is likely to firmly adhere to the surface of a whiteboard. Particularly, it becomes more difficult to erase the writing on the whiteboard as time passes.

The second solid drawing material includes a separating agent so as to provide erasable writing on a whiteboard. The separating agent used in the second solid drawing material may be the same as that used in the first solid drawing material, i.e., an oily material which hardly volatilizes at room temperature (25° C.). However, in the second solid drawing material, an alkyl ester of higher fatty acid having 6 to 30 carbon atoms is particularly preferably used as a separating agent. Preferred examples of such a higher fatty acid alkyl ester include butyl laurate, isopropyl myristate, butyl myristate, ethyl palmitate, isopropyl palmitate, methyl stearate, and butyl stearate. Liquid paraffin is also preferably used as a separating agent.

Among these separating agents, one hardly miscible with the above-described resin and having a boiling point of 200° C. or higher is particularly preferably used. The reason for this can be considered as follows. When such a solid drawing material is applied on a whiteboard to form writing, or film formed of the solid drawing material, the oily material hardly miscible with the above-described resin interposes between the film and the surface of the whiteboard, thereby improving erasability of writing. From the viewpoint of improving erasability of writing, n-butyl stearate is one of the most preferable separating agents.

In the second solid drawing material, the oily material which hardly volatilizes at room temperature is dispersed as it is, that is, such an oily material is not used in the form of an O/W type emulsion because an organic solvent is used as a solvent.

The second solid drawing material usually contains the separating agent in an amount of 1 to 30% by weight, preferably in an amount of 5 to 30% by weight, most preferably in an amount of 10 to 25% by weight. If the amount of a separating agent contained in the solid drawing material exceeds 30% by weight, the resultant solid drawing material provides writing that leaves stains on a whiteboard even after wiped with an eraser. In addition, such a solid drawing material is so soft that it is difficult to provide writing. On the other hand, if the amount of a separating agent contained in the solid drawing material is less than 1% by weight, writing is likely to firmly adhere to the surface of a whiteboard and is not readily erased.

When necessary, the second solid drawing material of the invention may further contain a plasticizer in an appropriate amount in addition to the components described above. Examples of such a plasticizer include diethyl phthalate, dibutyl phthalate, dioctyl phthalate, 2-ethylhexyl epoxyhexahydrophthalate, 2-ethylhexyl sebacate, and tricresyl phosphate.

Furthermore, when necessary, the second solid drawing material of the invention may further contain any additive conventionally used for solid drawing materials in an appropriate amount. Examples of such an additive include a filler, a leveling agent, a viscosity controlling agent, a structural tackifiers, and a drying agent.

A method of producing the second solid drawing material is not particularly limited. Basically, it can be obtained by mixing the above-described various components evenly and solidifying the mixture. Specifically, the second solid drawing material of the invention can be obtained by adding a separating agent and a coloring agent to an organic solvent in this order, mixing them with stirring to obtain a mixture, heating the mixture to a temperature near the boiling point of the organic solvent to dissolve a solidifying agent therein to obtain a homogeneous mixture, pouring the mixture into a container having a desired shape, and cooling the mixture to solidify it.

The thus obtained second solid drawing material has good drawing properties when provides writing on a whiteboard, thereby enabling uniform writing to be obtained. Further, the writing is not firmly adhered to the surface of the whiteboard. That is, the solid drawing material has erasability as high as that of ink for erasable marking pens.

EXAMPLES

First Solid Drawing Material

Hereinbelow, the invention will be described with reference to Examples and Comparative Examples of the first solid drawing material. In these Examples and Comparative Examples, crayon-like solid drawing materials were prepared in the following manner. First, a pigment or a water dispersion of the pigment, an O/W type emulsion of an oily material which hardly volatilizes at room temperature, (a binder resin), and water were mixed at room temperature with stirring to obtain a mixture, and then a fatty acid alkali metal salt as a solidifying agent was added to the mixture. The mixture was heated to 90° C. and was then stirred for 30 minutes at 90° C. to obtain a homogeneous mixture. The mixture was poured into a cylindrical mold while maintained at 90° C., and was then rapidly cooled to room temperature.

In each of the following Examples and Comparative Examples except for Examples 8 and 9, the amount of each of the components of the solid drawing material is expressed in terms of % by weight, and the balance is water. The solid drawing materials of Examples 8 and 9 were obtained by drying the solid drawing materials of Examples 1 and 2 for 3 days at 50° C. by the application of heat, respectively, so as to have substantially no water.

Example 1

| | | |
|---|---|---|
| Pigment dispersion | Water dispersion of black pigment A [1] | 30.0 |
| Separating agent | Emulsion of cetyl isooctanoate (oily material 50%) | 20.0 |
| Solidifying agent | Sodium stearate | 15.0 |
| | Sodium laurate | 5.0 |

Example 2

| | | |
|---|---|---|
| Pigment dispersion | Water dispersion of red pigment B [2] | 30.0 |
| Binder resin | Aqueous solution of partially-saponified polyvinyl alcohol resin (15% by weigh) | 15.0 |
| Separating agent | Emulsion of n-butyl stearate (oily material 50%) | 25.0 |
| Solidifying agent | Sodium oleate | 5.0 |
| | Sodium stearate | 15.0 |

Example 3

| | | |
|---|---|---|
| Pigment dispersion | Water dispersion of blue pigment C [3] | 30.0 |
| Binder resin | Aqueous solution of partially-saponified polyvinyl alcohol resin (15% by weigh) | 15.0 |

-continued

| | | |
|---|---|---|
| Separating agent | Emulsion of white mineral oil (oily material 50%) | 20.0 |
| Solidifying agent | Sodium stearate | 15.0 |
| | Potassium stearate | 5.0 |

Example 4

| | | |
|---|---|---|
| Pigment dispersion | Water dispersion of green pigment D [4)] | 30.0 |
| Binder resin | Aqueous solution of partially-saponified polyvinyl alcohol resin (15% by weigh) | 15.0 |
| Separating agent | Emulsion of caprylic/capric triglyceride (oily material 50%) | 25.0 |
| Solidifying agent | Sodium stearate | 12.0 |
| | Sodium cocoate | 8.0 |

Example 5

| | | |
|---|---|---|
| Pigment dispersion | Water dispersion of black pigment A [1)] | 30.0 |
| Separating agent | Emulsion of n-butyl stearate (oily material 50%) | 20.0 |
| Solidifying agent | Sodium stearate | 13.0 |
| | Mixed fatty acid sodium salt | 5.0 |

Example 6

| | | |
|---|---|---|
| Pigment | Carbon black | 4.5 |
| Binder resin | Aqueous solution of partially-saponified polyvinyl alcohol resin (15% by weigh) | 25.0 |
| Separating agent | Emulsion of cetyl isooctanoate (oily material 50%) | 20.0 |
| Solidifying agent | Sodium stearate | 15.0 |
| | Sodium laurate | 5.0 |

Example 7

| | | |
|---|---|---|
| Pigment | Red pigment | 4.5 |
| Binder resin | Aqueous solution of partially-saponified polyvinyl alcohol resin (15% by weigh) | 25.0 |
| Separating agent | Emulsion of n-butyl stearate (oily material 50%) | 25.0 |
| Solidifying agent | Sodium stearate | 15.0 |
| | Sodium oleate | 5.0 |

Example 8

A chalk-like solid drawing material was obtained by drying the solid drawing material obtained in Example 1 for 3 days at 50° C.

Example 9

A chalk-like solid drawing material was obtained by drying the solid drawing material obtained in Example 2 for 3 days at 50° C.

Comparative Example 1

| | | |
|---|---|---|
| Pigment dispersion | Water dispersion of black pigment A [1)] | 30.0 |
| Separating agent | Cetyl isooctanoate | 10.0 |
| Solidifying agent | Sodium stearate | 15.0 |
| | Sodium laurate | 5.0 |

Comparative Example 2

| | | |
|---|---|---|
| Pigment dispersion | Water dispersion of red pigment B [2)] | 30.0 |
| Binder resin | Aqueous solution of partially-saponified polyvinyl alcohol resin (15% by weigh) | 15.0 |
| Separating agent | White mineral oil | 15.0 |
| Solidifying agent | Sodium stearate | 15.0 |
| | Sodium oleate | 5.0 |

Comparative Example 3

| | | |
|---|---|---|
| Pigment dispersion | Water dispersion of blue pigment C [3)] | 30.0 |
| Binder resin | Aqueous solution of partially-saponified polyvinyl alcohol resin (15% by weigh) | 15.0 |
| Separating agent | Caprylic/Capric triglyceride | 10.0 |
| Solidifying agent | Sodium stearate | 15.0 |
| | Potassium stearate | 5.0 |

Comparative Example 4

| | | |
|---|---|---|
| Pigment | Carbon black | 4.5 |
| Binder resin | Aqueous solution of partially-saponified polyvinyl alcohol resin (15% by weigh) | 25.0 |
| Separating agent | Cetyl isooctanoate | 10.0 |
| Solidifying agent | Sodium stearate | 15.0 |
| | Sodium laurate | 5.0 |

Comparative Example 5

| | | |
|---|---|---|
| Pigment | Red pigment | 4.5 |
| Binder resin | Aqueous solution of partially-saponified polyvinyl alcohol resin (15% by weigh) | 25.0 |
| Separating agent | White mineral oil | 15.0 |
| Solidifying agent | Sodium stearate | 15.0 |
| | Sodium oleate | 5.0 |

Example 10

| | | |
|---|---|---|
| Pigment dispersion | Water dispersion of black pigment A [1)] | 30.0 |
| Separating agent | Emulsion of cetyl isooctanoate (oily material 50%) | 25.0 |

-continued

| | | |
|---|---|---|
| Solidifying agent | Sodium stearate | 12.0 |
| | Sodium laurate | 8.0 |

Example 11

| | | |
|---|---|---|
| Pigment dispersion | Water dispersion of red pigment B [2] | 30.0 |
| Separating agent | Emulsion of white mineral oil (oily material 50%) | 25.0 |
| Solidifying agent | Sodium stearate | 15.0 |
| | Sodium cocoate | 5.0 |

Example 12

| | | |
|---|---|---|
| Pigment dispersion | Water dispersion of blue pigment C [3] | 30.0 |
| Separating agent | Emulsion of caprylic/capric triglyceride (oily material 50%) | 20.0 |
| Solidifying agent | Sodium laurate | 5.0 |
| | Mixed fatty acid sodium salt | 15.0 |

Example 13

| | | |
|---|---|---|
| Pigment dispersion | Water dispersion of black pigment A [1] | 30.0 |
| Separating agent | Emulsion of cetyl isooctanoate (oily material 50%) | 25.0 |
| Silicone oil | KF96-100CS | 3.0 |
| Solidifying agent | Sodium stearate | 12.0 |
| | Sodium laurate | 8.0 |

Example 14

| | | |
|---|---|---|
| Pigment dispersion | Water dispersion of red pigment B [2] | 30.0 |
| Separating agent | Emulsion of white mineral oil (oily material 50%) | 25.0 |
| Silicone oil | KS66 | 4.0 |
| Solidifying agent | Sodium stearate | 15.0 |
| | Sodium cocoate | 5.0 |

Example 15

| | | |
|---|---|---|
| Pigment dispersion | Water dispersion of blue pigment C [3] | 30.0 |
| Separating agent | Emulsion of caprylic/capric triglyceride (oily material 50%) | 20.0 |
| Silicone oil | KF54 | 2.0 |
| Solidifying agent | Sodium laurate | 5.0 |
| | Mixed fatty acid sodium salt | 15.0 |

Example 16

A chalk-like solid drawing material was obtained by drying the solid drawing material obtained in Example 13 for one week at 50° C.

Example 17

A chalk-like solid drawing material was obtained by drying the solid drawing material obtained in Example 14 for one week at 50° C.

Notes:

(1) Water Dispersion of Pigment

1) Water Dispersion of Black Pigment A

This water dispersion of black pigment A contained carbon black (manufactured by Degussa under the trade name of "Special Black 100") in an amount of 15% by weight and a polyvinyl alcohol resin (manufactured by Kuraray under the trade name of "Kuraray Poval PVA-403" and having a degree of saponification of 78.5 to 81.5 mol %) in an amount of 15% by weight.

2) Water Dispersion of Red Pigment B

This water dispersion of red pigment B contained a red pigment (manufactured by Clariant Japan K.K. under the trade name of "Novoperm Red GLF") in an amount of 15% by weight and a polyvinyl alcohol resin (manufactured by Kuraray under the trade name of "Kuraray Poval PVA-405" and having a degree of saponification of 80.0 to 83.0 mol %) in an amount of 7% by weight.

3) Water Dispersion of Blue Pigment C

This water dispersion of blue pigment C contained a blue pigment (manufactured by Avecia under the trade name of "Monolight blue 3R") in an amount of 15% by weight and an ammonia neutralized styrene-acrylic resin (manufactured by Johnson Polymer under the trade name of "Joncryl 62") in an amount of 7% by weight.

4) Water Dispersion of Green Pigment D

This water dispersion of green pigment D contained a green pigment (manufactured by Toyo Ink Mfg. Co., Ltd. under the trade name of "Lionol green 6YK") in an amount of 15% by weight and an ammonia neutralized styrene-maleic acid resin (manufactured by Seiko Chemical Co., Ltd. under the trade name of "Hi-Cross X-1") in an amount of 7% by weight.

(2) Oily Material

The emulsion of cetyl isooctanoate was prepared using a mixture of polyoxyethylene (20) polyoxypropylene (4) cetyl ether and polyoxyethylene (5) oleyl ether. The numbers in parentheses are the number of moles of ethyleneoxide or propyleneoxide added.

The emulsion of n-butyl stearate was prepared using a mixture of polyoxyethylene sorbitan monostearate and sorbitan monostearate.

The emulsion of white mineral oil was prepared using polyoxyethylene oleyl ether.

The emulsion of caprylic/capric triglyceride was prepared using sodium polyoxyethylene oleyl ether phosphate.

(3) Silicone Oil

KF96-100CS is dimethyl silicone oil manufactured by Shin-Etsu Chemical Co., Ltd. and having a viscosity of 100 cSt at 25° C.

KS66 is dimethyl silicone oil containing powdered silica, manufactured by Shin-Etsu Chemical Co., Ltd.

KF54 is methylphenyl silicone oil manufactured by Shin-Etsu Chemical Co., Ltd.

pletely erased even when wiped with an eraser more than 20 times or more. The evaluation results are shown in Table 1.

Standing Erasability of Writing

The solid drawing materials were stored for one month at room temperature after production. Erasability of writing was evaluated in the same manner as in the evaluation of initial erasability of writing except that the solid drawing materials stored for one month were used. The evaluation results are shown in Table 1.

TABLE 1

|  | Examples | | | | | | | | | Comparative Examples | | | | |
| --- | --- | --- | --- | --- | --- | --- | --- | --- | --- | --- | --- | --- | --- | --- |
|  | 1 | 2 | 3 | 4 | 5 | 6 | 7 | 8 | 9 | 1 | 2 | 3 | 4 | 5 |
| Feeling in drawing | a | a | a | a | a | a | a | b | b | a | a | a | a | a |
| Initial properties |  |  |  |  |  |  |  |  |  |  |  |  |  |  |
| Drawing properties | A | A | A | A | A | A | A | A | A | A | B | A | B | B |
| Erasability after 5 minutes | B | A | A | A | A | B | B | A | A | B | B | B | F | F |
| Erasability after one day | A | A | A | A | A | B | B | A | A | F | B | F | B | B |
| Erasability after storage |  |  |  |  |  |  |  |  |  |  |  |  |  |  |
| Drawing properties | A | A | A | A | A | A | A | A | A | F | F | B | F | F |
| Erasability after 5 minutes | A | A | A | A | A | B | B | A | A | — | — | B | — | — |
| Erasability after one day | A | A | A | A | A | B | B | A | A | — | — | F | — | — |

Evaluations were performed on each of the solid drawing materials obtained in Examples 1 to 9 and Comparative Examples 1 to 5 to examine feeling in drawing, drawing properties just after production, drawing properties after one month storage, initial erasability of writing, and standing erasability of writing.

Feeling in Drawing

The feeling in drawing of each of the solid drawing materials was evaluated according to the following two criteria. The mark "a" means that the solid drawing material had crayon-like feeling in drawing, and the mark "b" means that the solid drawing material had chalk-like feeling in drawing. The evaluation results are shown in Table 1.

Drawing Properties

A load of 200 g was applied to each of the solid drawing materials just after production to form a predetermined mark on an enamel whiteboard. Drawing properties were evaluated according to the following three criteria. The mark "A" means that writing was uniformly formed with no blur or faint part; the mark "B" means that writing was partially blurred or faint but the solid drawing material could be practically used without problems; and the mark "F" means that writing was significantly blurred or faint so that the solid drawing material could not be practically used. The evaluation results are shown in Table 1.

Initial Erasability of Writing

A load of 200 g was applied to each of the solid drawing materials just after production to form a predetermined mark on an enamel whiteboard. After a lapse of 5 minutes or one day, the writing was wiped with an eraser under a load of 200 g, and the number of times of wiping required to erase the writing was counted. Initial erasability of writing was evaluated according to the following three criteria. The mark "A" means that writing was erased by wiping with an eraser 10 times or less; the mark "B" means that writing was erased by wiping with an eraser more than 10 times but 20 times or less; and the mark "F" means that writing was not com- As is apparent from Table 1, every solid drawing material according to the invention has excellent drawing properties and can provide readily erasable writing even when left standing for a long time after production.

Next, evaluations were performed on each of the solid drawing materials obtained in Examples 10 to 17 to examine feeling in drawing, drawing properties just after production, initial erasability of writing, and standing erasability of writing.

Feeling in Drawing

The feeling in drawing of each of the solid drawing materials was evaluated according to the following two criteria. The mark "a" means that the solid drawing material had crayon-like feeling in drawing, and the mark "b" means that the solid drawing material had chalk-like feeling in drawing. The evaluation results are shown in Table 2.

Drawing Properties

A load of 200 g was applied to each of the solid drawing materials just after production to form a predetermined mark on an enamel whiteboard. Drawing properties were evaluated according to the following three criteria. The mark "A" means that writing was uniformly formed with no blur or faint part; the mark "B" means that writing was partially blurred or faint but the solid drawing material could be practically used without problems; and the mark "F" means that writing was significantly blurred or faint so that the solid drawing material could not be practically used. The evaluation results are shown in Table 2.

Erasability of Writing

A load of 200 g was applied to each of the solid drawing materials just after production to form a predetermined mark on an enamel whiteboard. After a lapse of 5 minutes or one day, the writing was wiped with an eraser under a load of 200 g, and the number of times of wiping required to erase the writing was counted. Initial erasability of writing was evaluated according to the number of times of wiping required to erase the writing. The evaluation results are shown in Table 2.

TABLE 2

|  | Examples | | | | | | | |
| --- | --- | --- | --- | --- | --- | --- | --- | --- |
|  | 10 | 11 | 12 | 13 | 14 | 15 | 16 | 17 |
| Feeling in drawing | a | a | a | a | a | a | b | b |
| Initial properties | | | | | | | | |
| Drawing properties | A | A | A | A | A | A | A | A |
| Erasability after 5 minutes (times) | 10 | 9 | 9 | 8 | 8 | 7 | 5 | 4 |
| Erasability after one day (times) | 9 | 8 | 9 | 7 | 6 | 7 | 5 | 4 |

The solid drawing materials of Examples 13 to 15 were produced in the same manner as in Examples 10 to 12, respectively, except that silicone oil was substituted for water being a solvent in an amount of 3 parts by weight. As is apparent from Table 2, the solid drawing materials of Examples 13 to 15 containing silicone oil were improved in erasability of writing.

Second Solid Drawing Material

Hereinbelow, the invention will be described with reference to Examples and Comparative Examples of the second solid drawing material. In these Examples and Comparative Examples, crayon-like solid drawing materials were prepared in the following manner. First, a separating agent and a coloring agent were added to an organic solvent in this order, and then they were mixed with stirring to obtain a mixture. The mixture was heated to a temperature near the boiling point of the organic solvent to dissolve a solidifying agent therein to obtain a homogeneous mixture. The mixture was poured into a container having a desired shape, and was then cooled to solidify it.

In each of the following Examples and Comparative Examples, the amount of each of the components of the solid drawing material is expressed in terms of % by weight, and the balance is water.

Example 1

| Solvent | Ethylene glycol butyl ether | 12.0 |
| --- | --- | --- |
|  | Propylene glycol n-butyl ether | 18.0 |
|  | Propylene glycol methyl ether acetate | 7.0 |
|  | Propylene glycol diacetate | 13.5 |
| Coloring agent | Carbon black | 7.5 |
| Resin | Cellulose acetate butylate | 12.0 |
| Separating agent | N-butyl stearate | 15.0 |
| Solidifying agent | Tribenzylidene sorbitol | 15.0 |

Example 2

| Solvent | Ethylene glycol butyl ether | 50.5 |
| --- | --- | --- |
| Coloring agent | Carbon black | 7.5 |
| Resin | Polyvinyl butyral | 12.0 |
| Separating agent | N-butyl stearate | 15.0 |
| Solidifying agent | Tribenzylidene sorbitol | 15.0 |

Example 3

| Solvent | Ethylene glycol butyl ether | 12.0 |
| --- | --- | --- |
|  | Propylene glycol n-butyl ether | 18.0 |
|  | Propylene glycol diacetate | 20.5 |
| Coloring agent | Carbon black | 7.5 |
| Resin | Cellulose acetate butylate | 12.0 |
| Separating agent | N-butyl stearate | 15.0 |
| Solidifying agent | Dibenzylidene sorbitol | 15.0 |

Example 4

| Solvent | Propylene glycol methyl ether acetate | 44.5 |
| --- | --- | --- |
| Coloring agent | Carbon black | 7.5 |
| Resin | Cellulose acetate butylate | 18.0 |
| Separating agent | N-butyl stearate | 15.0 |
| Solidifying agent | Tribenzylidene sorbitol | 15.0 |

Example 5

| Solvent | Ethylene glycol butyl ether | 12.0 |
| --- | --- | --- |
|  | Propylene glycol n-butyl ether | 18.0 |
|  | Propylene glycol methyl ether acetate | 7.0 |
|  | Propylene glycol diacetate | 22.5 |
| Coloring agent | Carbon black | 7.5 |
| Resin | Cellulose acetate butylate | 3.0 |
| Separating agent | N-butyl stearate | 15.0 |
| Solidifying agent | Tribenzylidene sorbitol | 15.0 |

Comparative Example 1

| Solvent | Ethylene glycol butyl ether | 4.5 |
| --- | --- | --- |
|  | Propylene glycol n-butyl ether | 18.0 |
|  | Propylene glycol diacetate | 5.0 |
| Coloring agent | Carbon black | 7.5 |
| Resin | Cellulose acetate butylate | 35.0 |
| Separating agent | N-butyl stearate | 15.0 |
| Solidifying agent | Tribenzylidene sorbitol | 15.0 |

Comparative Example 2

| Solvent | Propylene glycol n-butyl ether | 30.0 |
| --- | --- | --- |
|  | Propylene glycol methyl ether acetate | 7.0 |
|  | Propylene glycol diacetate | 30.0 |
| Coloring agent | Carbon black | 7.5 |
| Resin | Polyvinyl butyral | 7.5 |
| Separating agent | N-butyl stearate | 15.0 |
| Solidifying agent | Tribenzylidene sorbitol | 3.0 |

Comparative Example 3

| Solvent | Ethylene glycol butyl ether | 12.0 |
|---|---|---|
|  | Propylene glycol n-butyl ether | 18.0 |
|  | Propylene glycol methyl ether acetate | 7.0 |
|  | Propylene glycol diacetate | 13.5 |
| Coloring agent | Carbon black | 7.5 |
| Resin | Cellulose acetate butylate | 7.5 |
| Separating agent | N-butyl stearate | 3.0 |
| Solidifying agent | Tribenzylidene sorbitol | 15.0 |

Evaluations were performed on each of the solid drawing materials obtained in Examples 1 to 5 and Comparative Examples 1 to 3 to examine drawing properties and erasability of writing.

Drawing Properties

A load of 200 g was applied to each of the solid drawing materials just after production to form a predetermined mark on an enamel whiteboard. Drawing properties were evaluated according to the following three criteria. The mark "A" means that writing was uniformly formed with no blur or faint part; the mark "B" means that writing was partially blurred or faint but the solid drawing material could be practically used without problems; and the mark "F" means that writing was significantly blurred or faint so that the solid drawing material could not be practically used. The evaluation results are shown in Table 3.

Initial Erasability of Writing

A load of 200 g was applied to each of the solid drawing materials just after production to form a predetermined mark on an enamel whiteboard. After a lapse of 5 minutes, the writing was wiped with an eraser under a load of 200 g, and the number of times of wiping required to erase the writing was counted. Initial erasability of writing was evaluated according to the number of times of wiping required to erase the writing. The mark "A" means that writing was erased by wiping with an eraser 10 times or less; the mark "B" means that writing was erased by wiping with an eraser more than 10 times but 20 times or less; and the mark "F" means that writing was not completely erased even when wiped with an eraser more than 20 times. The evaluation results are shown in Table 3.

TABLE 3

|  | Examples | | | | | Comparative Examples | | |
|---|---|---|---|---|---|---|---|---|
|  | 1 | 2 | 3 | 4 | 5 | 1 | 2 | 3 |
| Drawing properties | A | A | B | B | A | F | F | B |
| Erasability | A | B | B | B | B | F | — | F |

As is apparent from Table 3, the solid drawing materials according to the present invention are excellent in drawing properties and erasability. However, the solid drawing materials of Comparative Examples 1 and 2 are poor in drawing properties, and the solid drawing materials of Comparative Examples 1 and 3 are poor in erasability.

What is claimed is:

1. A solid drawing material which comprises water, a coloring agent, a solidifying agent that is a fatty acid alkali metal salt, and an O/W type emulsion of a separating agent that is an oily material which hardly volatilizes at room temperature, wherein the oily material is at least one selected from the group consisting of aliphatic carboxylic acid esters, higher hydrocarbons having 6 to 30 carbon atoms, and higher alcohols having 6 to 30 carbon atoms, and wherein the aliphatic carboxylic acid ester is at least one selected from the group consisting of esters of higher fatty acid having 6 to 30 carbon atoms, dibasic acid diesters, mono- and diesters of dihydric alcohols, mono-, di-, and triesters of trihydric alcohols, and polyglycerol esters.

2. The solid drawing material according to claim 1, wherein the coloring agent is in the form of a water dispersion of a pigment obtained by dispersing the pigment in water by the use of a dispersant that is a water-soluble resin.

3. The solid drawing material according to claim 2, wherein the weight ratio of the dispersant to the pigment is in the range of 0.2 to 3.

4. A method of producing the solid drawing material according to claim 2, comprising the steps of:
   mixing a water dispersion of a pigment obtained by dispersing the pigment in water by the use of a dispersant that is a water-soluble resin in such a manner that the weight ratio of the water-soluble resin to the pigment is in the range of 0.2 to 3, a solidifying agent that is a fatty acid alkali metal salt, and an O/W type emulsion of a separating agent that is an oily material which hardly volatilizes at room temperature, in water by the application of heat to dissolve the fatty acid alkali metal salt in water to obtain a mixture;
   pouring the mixture into a mold; and
   cooling the mixture to solidify it.

5. A method of producing the solid drawing material according to claim 2, comprising the steps of:
   mixing a water dispersion of a pigment obtained by dispersing the pigment in water by the use of a dispersant that is a water-soluble resin in such a manner that the weight ratio of the dispersant to the pigment is in the range of 0.2 to 3, a solidifying agent that is a fatty acid alkali metal salt, and an O/W type emulsion of a separating agent that is an oily material which hardly volatilizes at room temperature, in water by the application of heat to dissolve the fatty acid alkali metal salt in water to obtain a mixture;
   cooling the mixture to solidify it to obtain a molded product; and
   drying the molded product by the application of heat to remove water from the molded product.

6. A solid drawing material which comprises water, a coloring agent, a solidifying agent that is a fatty acid alkali metal salt, an O/W type emulsion of a separating agent that is an oily material which hardly volatilizes at room temperature and silicone oil, wherein the oily material is at least one selected from the group consisting of aliphatic carboxylic acid esters, higher hydrocarbons having 6 to 30 carbon atoms, and higher alcohols having 6 to 30 carbon atoms, and wherein the aliphatic carboxylic acid ester is at least one selected from the group consisting of esters of higher fatty acid having 6 to 30 carbon atoms, dibasic acid diesters, mono- and diesters of dihydric alcohols, mono-, di-, and triesters of trihydric alcohols, and polyglycerol esters.

7. The solid drawing material according to claim 6, wherein the coloring agent is in the form of a water dispersion of a pigment obtained by dispersing the pigment in water by the use of a dispersant that is a water-soluble resin.

8. The solid drawing material according to claim 7, wherein the weight ratio of the dispersant to the pigment is in the range of 0.2 to 3.

9. A method of producing the solid drawing material according to claim 7, comprising the steps of:

mixing a water dispersion of a pigment obtained by dispersing the pigment in water by the use of a dispersant that is a water-soluble resin in such a manner that the weight ratio of the water-soluble resin to the pigment is in the range of 0.2 to 3, a solidifying agent that is a fatty acid alkali metal salt, an O/W type emulsion of a separating agent that is an oily material which hardly volatilizes at room temperature and silicone oil, in water by the application of heat to dissolve the fatty acid alkali metal salt in water to obtain a mixture;

pouring the mixture into a mold; and cooling the mixture to solidify it.

10. A method of producing the solid drawing material according to claim 7, comprising the steps of:

mixing a water dispersion of a pigment obtained by dispersing the pigment in water by the use of a dispersant that is a water-soluble resin in such a manner that the weight ratio of the dispersant to the pigment is in the range of 0.2 to 3, a solidifying agent that is a fatty acid alkali metal salt, an O/W type emulsion of a separating agent that is an oily material which hardly volatilizes at room temperature, and silicone oil, in water by the application of heat, to dissolve the fatty acid alkali metal salt in water to obtain a mixture;

cooling the mixture to solidify it to obtain a molded product; and drying the molded product by the application of heat to remove water from the molded product.

* * * * *